US009787651B2

(12) United States Patent
Boudguiga et al.

(10) Patent No.: US 9,787,651 B2
(45) Date of Patent: Oct. 10, 2017

(54) METHOD AND DEVICE FOR ESTABLISHING SESSION KEYS

(71) Applicant: COMMISSARIAT A L'ENERGIE ATOMIQUE ET AUX ENERGIES ALTERNATIVES, Paris (FR)

(72) Inventors: Aymen Boudguiga, Gif-sur-Yvette (FR); Nouha Oualha, Gif-sur-Yvette (FR); Alexis Olivereau, Gif-sur-Yvette (FR); Christophe Janneteau, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 205 days.

(21) Appl. No.: 14/779,487

(22) PCT Filed: Mar. 12, 2014

(86) PCT No.: PCT/EP2014/054791
§ 371 (c)(1),
(2) Date: Sep. 23, 2015

(87) PCT Pub. No.: WO2014/154482
PCT Pub. Date: Oct. 2, 2014

(65) Prior Publication Data
US 2016/0044007 A1    Feb. 11, 2016

(30) Foreign Application Priority Data
Mar. 28, 2013    (FR) ...................................... 13 52812

(51) Int. Cl.
*H04L 29/06*    (2006.01)
*H04L 9/08*    (2006.01)

(52) U.S. Cl.
CPC .......... *H04L 63/0442* (2013.01); *H04L 9/083* (2013.01); *H04L 63/061* (2013.01); *H04L 2209/80* (2013.01)

(58) Field of Classification Search
CPC .... H04L 63/0442; H04L 9/083; H04L 63/061
See application file for complete search history.

(56) References Cited

U.S. PATENT DOCUMENTS

| 7,596,690 | B2* | 9/2009 | Singh | .................... H04L 9/3273 713/151 |
| 2006/0053289 | A1 | 3/2006 | Singh | |
| 2012/0191971 | A1 | 7/2012 | Battistello et al. | |

FOREIGN PATENT DOCUMENTS

WO    2009/070075 A1    6/2009

OTHER PUBLICATIONS

Needham et al., "Using Encryption for Authentication in Large Networks of Computers," Communication of the ACM, vol. 21, No. 12, 1978, pp. 993-999.

(Continued)

*Primary Examiner* — Jeffrey Pwu
*Assistant Examiner* — Thong Truong
(74) *Attorney, Agent, or Firm* — Baker & Hostetler LLP

(57) ABSTRACT

A method and a device for setting up a session key between a source entity and a target entity in a communication network comprises a plurality of communicating entities. The method, which relies on the use of symmetrical cryptographic primitives, provides each entity in the session with protection against denial of service attacks by setting up a session in four or five message exchanges.

15 Claims, 6 Drawing Sheets

(56) References Cited

OTHER PUBLICATIONS

Steiner et al., "Kerberos: An Authentication Service for Open Network Systems," Jan. 12, 1988.
Arkko et al., "MIKEY Multimedia Internet KEYing," Standards Track, Ericsson Research, Aug. 2004, pp. 1-66.
Menezes et al., "Chapter 10: Identification and Entity Authentication," Handbook of Applied Cryptography, 1996, pp. 385-424.
Colin Boyd, "A Class of Flexible and Efficient Key Management Protocols," Proceedings of the 9th Computer Security Workshop, Jun. 10, 1996, pp. 2-8, XP002719218.
Kalvinder Singh et al., "A Minimal Protocol for Authenticated Key Distribution in Wireless Sensor Networks," IEEE Fourth International Conference on Intelligent Sensing and Information Processing 2006, pp. 78-83, XP031124309.
Dave Otway et al., "Efficient and Timely Mutual Authentication," 1987.
J. Mattsson et al., MIKEY-TICKET: Ticket-Based Modes of Key Distribution in Multimedia Internet KEYing (MIKEY), Internet Engineering Task Force (IETF), Mar. 2011.
A. Menezes et al., "Chapter 13: Key Management Techniques," Handbook of Applied Cryptography, 1996 pp. 543-590, XP001525013.

\* cited by examiner

METHOD AND DEVICE FOR ESTABLISHING SESSION KEYS

CROSS-REFERENCE TO RELATED APPLICATIONS

This application is a National Stage of International patent application PCT/EP2014/054791, filed on Mar. 12, 2014, which claims priority to foreign French patent application No. FR 1352812, filed on Mar. 28, 2013, the disclosures of which are incorporated by reference in their entirety.

FIELD OF THE INVENTION

The invention concerns the field of network communications and particularly that of encrypted communications between the entities of a network.

BACKGROUND

The setup of a session key between two entities of a communication network is a fundamental prerequisite for the implementation of the great majority of cryptographic services that are intended to provide security for exchanges between these entities. Thus, the protection of interchanged data against attacks aiming to modify said data or simply to gain knowledge thereof is generally reliant on symmetrical cryptographic primitives, in which the entities communicating with one another use the same key for sending (ciphering, integrity protection) and receiving (deciphering, checking integrity) a message.

The setup of a session key is a procedure that is intended to take place numerous times over the life of a communicating entity. A new symmetrical key must be used for every secure exchange with every new correspondent. These correspondents are all the more numerous when the entity is a participant in a scenario promoting interactions between members, for example of sensor network (Wireless Sensor Network, WSN), Machine to Machine (M2M) or Internet of Things (IoT) type. Furthermore, a session key is characterized by a limited life, and must regularly be refreshed. Thus, the procedure implemented for setting up a session key is particularly important and requires careful design.

Several parameters need to be considered for judging the quality of a session key setup protocol. Firstly, the security of the protocol must be guaranteed. Thus, the confidentiality of the key that is set up and the mutual authentication of the two correspondents must be ensured. Added to this are other security parameters, such as protection against denial of service attacks, which protects the entities involved in the execution of the protocol against attacks that aim to exhaust the power resources and/or system resources thereof. Secondly, the session key setup protocol must be efficient in terms of required passband and power consumption, and particularly from the point of view of cryptographic computations that are implemented. This second criterion is particularly important when the session key setup protocol needs to be implemented by entities that have only small power resources, such as a battery, or only low computation and/or memory capacity. Finally, the protocol can provide additional functionalities, such as interoperability of the authentication mechanisms between two nodes implementing it or the possibility of centralized control over the exchange of keys and/or the possibility of centralized definition of security policies that accompany the keys that are set up.

Principally, three approaches have been developed for setting up session keys between two nodes.

The first family is key transport, which involves transporting, in a manner secured by encryption, one or more secret values from one of the two participants in a session to the other. These transportations of secret values can either take place in a single direction, this mode being known as "one-pass key transport protocol", or can take place in both directions, this mode then being known as "two-pass key transport protocol". The session key is then derived from these secret values.

The second family of solutions for setting up session keys is key agreement. This approach involves exchanging public values between the two nodes, from which a common session key is recovered by the two entities participating in the exchange without the exchanged public values needing to be deciphered. The main protocol known for "key agreement" is the Diffie-Hellman protocol. In terms of resources consumed, principally with regard to the power consumed for cryptographic operations, "key agreement" is a costly approach.

A third family of solutions for setting up session keys is key distribution. In this approach, a third entity often called a "trusted third party" intervenes to provide the other two participants with either a secret value that allows them to compute the session key or with the session key itself. However, key distribution likewise calls on direct exchanges between the two participants. This is because the latter have to provide evidence of their involvement in the protocol, establish the freshness of the messages that they send and prove that they know the secret that is established. Key distribution, although a solution that is simple to implement and that is lightweight in terms of cryptographic operations required and power consumed, has disadvantages that have not yet been resolved by existing solutions.

Well known 'key distribution' solutions are those of Needham and Schroeder, or else the Kerberos protocol or even the MIKEY-Ticket approach.

The Needham and Schroeder key transport protocol, which is presented in the document "Using encryption for authentication in large networks of computers", Communication of the ACM, volume 21, number 12, 1978, contains five message exchanges between two entities, an initiator (I) and a responder (R), that each share a ciphering key with a trusted third party (TC). The exchange of the five messages is shown in FIG. 1. One of the major problems of the Needham and Schroeder protocol is an impersonation attack by an attacker pretending to be the initiator and replaying the third message (Message3) between the initiator and the responder. The attacker, who may know the key generated by the trusted third party, can then decipher the fourth message and usurp the session by sending the last message.

The normalized Kerberos protocol described in the document by Kohl and Neuman "The Kerberos network authentication service", September 1993, is illustrated in FIG. 2 and is based on the exchange of four messages. The first two messages are exchanged between the initiator and the trusted third party. The last two messages are exchanged between the initiator and the responder. A disadvantage of the Kerberos protocol is that it is not symmetrical vis-à-vis the initiator and the receiver. The trusted third party has no assurance that the receiver has actually been contacted or has actually agreed to participate in the secure transaction. In fact, the Kerberos protocol has limited applications and is rather intended to allow access from an initiating client to a resource that is assumed not to be subject to malicious behavior, such as a printer or a file server, for example.

A known improvement to the Needham and Schroeder protocol is the Otway and Rees protocol illustrated in FIG. 3 and described in the document from the authors "Efficient and timely mutual authentication", 1987. However, this protocol still has the disadvantage that the trusted third party interacts directly only with a single one of the two participants, in this case the responder.

The patent WO 2009/070075 A1 from Blom et al. entitled "Key management for secure communication" presents a method for setting up session keys for secure communications between two entities. The method relies on the MIKEY-Ticket key distribution protocol specified in RFC 6043 from Mattsson and Tian, "MIKEY-Ticket: Ticket-based modes of key distribution in Multimedia Internet KEYing (MIKEY)". The key management is based on a centralized key management trust service where the initiator and the responder each share a common key with a trusted third party.

In point of fact, owing to its design, this protocol can be the target for denial of service attacks. A person skilled in the art knows the various forms of denial of service attacks. An attacker can carry out a denial of service by exploiting implementation errors in communication protocols, for example if the protocol used is implemented so as to block the nodes when they receive unknown data. An attacker will then be able to carry out a denial of service attack by sending messages containing erroneous fields to the responder, its target. Another way of carrying out a denial of service is to start a communication with the target and then to stop sending messages so as to block the target in a state of waiting for acknowledgement and to saturate its reception stack. Finally, the denial of service can be distributed by using several attackers at the same time in order to saturate the target as quickly as possible and to make it difficult to trace the attacker.

Thus, known approaches, although providing alternative solutions for setting up session keys, do not meet all the security needs that are expected for a session key setup protocol owing to their disadvantages.

The proposed invention allows these needs to be met.

SUMMARY OF THE INVENTION

It is an object of the present invention to propose a method for setting up session keys that is safe and protected against denial of service attacks.

Advantageously, the invention provides both an initiator node and a responder node with protection against denial of service attacks.

It is another object of the present invention to propose a method for setting up session keys that is efficient in terms of resources consumed. Thus, the method of the invention allows a session to be set up in four or five message exchanges and relies on the use of symmetrical cryptographic primitives.

Advantageously, the present invention will be implemented in fields of security of machine-to-machine (M2M) communications or within the context of networks of nodes that are constrained in terms of resources, such as sensor and/or actuator nodes, which are among the nodes with the greatest constraints in terms of resources and able to be prompted to have to set up session keys dynamically.

In order to obtain the desired results, a method, a device and a computer program product are proposed.

In particular, in a communication network comprising a plurality of communicating entities, a method for setting up a session key between a source entity (I) and a target entity (R), the source entity sharing with a third-party trusted entity (TC) a first source key $K_{Ie}$ for ciphering data and a second source key $K_{Ia}$ for computing a message authentication code for the source entity, the target entity sharing with said third-party trusted entity a first target key $K_{Re}$ for ciphering data and a second target key $K_{Ra}$ for computing a message authentication code for the target entity, the method comprises the steps of:

receiving, at the third-party trusted entity, a message from the source entity for setting up a session with the target entity, the message containing at least identifiers from the source entity, from the target entity, from said third-party trusted entity and an authentication code based on the second source key $K_{Ia}$;

generating a pair $K_{IR}$ of keys ($K_{IRa}$, $K_{IRe}$) for the source entity and for the target entity;

encrypting the pair $K_{IR}$ of keys ($K_{IRa}$, $K_{IRe}$) by means of the first source key $K_{Ie}$ and by means of the first target key $K_{Re}$;

sending to the target entity a message containing at least the encrypted key $K_{IR}$ and an authentication code based on the second target key $K_{Ra}$;

receiving from the target entity a message containing at least the identifiers from the source entity, from the target entity, from said third-party trusted entity and an authentication code based on the second target key $K_{Ra}$; and sending to the source entity a message containing at least the encrypted key $K_{IR}$ and an authentication code based on the second source key $K_{Ia}$.

Advantageously, the source key $K_{Ie}$ for ciphering data and the source key $K_{Ia}$ for the authentication code are derived from an initial key that is obtained after a step of authentication of the target entity to the third-party trusted entity.

In one variant, the message received from the source entity moreover comprises a source nonce ($N_I$) for proving the freshness of the message from the source entity.

In another variant, the step of generating the key $K_{IRa}$ for the source entity comprises the steps of concatenating the key $K_{IRa}$ with the identifiers from the target entity, from the third-party trusted entity and from the nonce $N_I$ and of ciphering the concatenated assembly using the first target key $K_{Re}$.

Advantageously, the message sent to the target entity moreover comprises the nonce ($N_I$), and the authentication code based on the second target key $K_{Ra}$ is computed on the nonce.

Advantageously, the message received from the target entity moreover comprises the source nonce ($N_I$) and a target nonce ($N_R$) for proving the freshness of the target message.

In one implementation variant, the step of computing an authentication code by using the second target key $K_{Ra}$, the identifiers, the source and target nonces ($N_I$, $N_R$) and the received authentication code based on the second target key $K_{Ra}$ and the step of checking whether the computed authentication code is equal to the received authentication code.

Advantageously, the message sent to the source entity moreover comprises the source and target nonces ($N_I$, $N_R$).

Advantageously, the identifiers from the source and target entities are either IPv6 addresses, MAC addresses or URLs.

According to the variants, the nonce is either a piece of timestamp information, a random number or a counter.

In another variant, the message sent by the third-party trust entity to the target entity moreover contains a key ciphered by the keys $K_{Ie}$ and $K_{Ia}$ and where the message received from the target entity and the message sent to the source entity are a single message sent from the target entity to the source entity.

In another variant, the method moreover comprises a step of sending a message from the source entity to the target entity that contains the identifiers from the source entity and from the target entity, the source and target nonces ($N_I$, $N_R$) and an authentication code computed using the key $K_{IRa}$ shared between the source entity and the target entity.

The invention moreover concerns a system for setting up a session key between a source entity and a target entity, the source entity sharing with a third-party trusted entity a first source key $K_{Ie}$ for ciphering data and a second source key $K_{Ia}$ for computing a message authentication code for the source entity, the target entity sharing with said third-party trusted entity a first target key $K_{Re}$ for ciphering data and a second target key $K_{Ra}$ for computing a message authentication code for the target entity, the system comprising means for implementing all the steps of the claimed method.

The invention can be implemented in the form of a computer program product that comprises code instructions allowing the steps of the claimed method to be performed when the program is executed on a computer.

BRIEF DESCRIPTION OF THE DRAWINGS

Various aspects and advantages of the invention will emerge from the description of a preferred, but nonlimiting, mode of implementation of the invention, with reference to the figures below.

DETAILED DESCRIPTION

Figure 1:
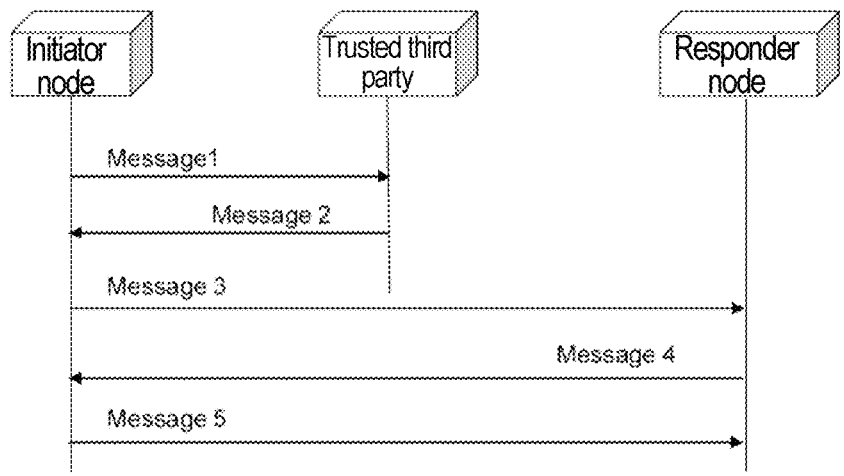
FIG. 1 illustrates the message exchanges based on the Needham and Schroeder method.
Figure 2:
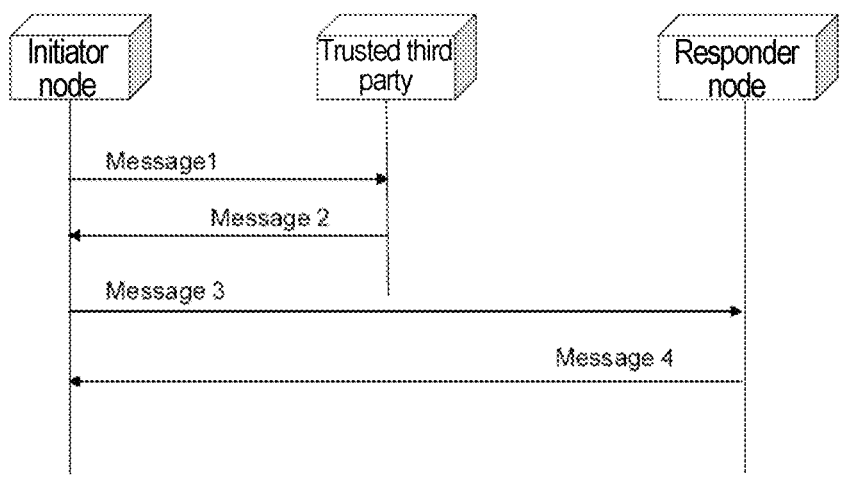
FIG. 2 illustrates the message exchanges based on the Kerberos method.
Figure 3:
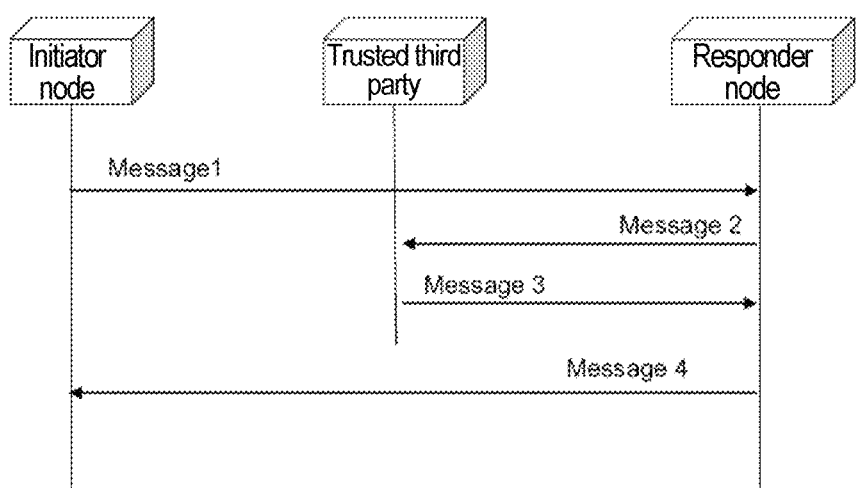
FIG. 3 illustrates the message exchanges based on the Otway and Rees method.
Figure 4:
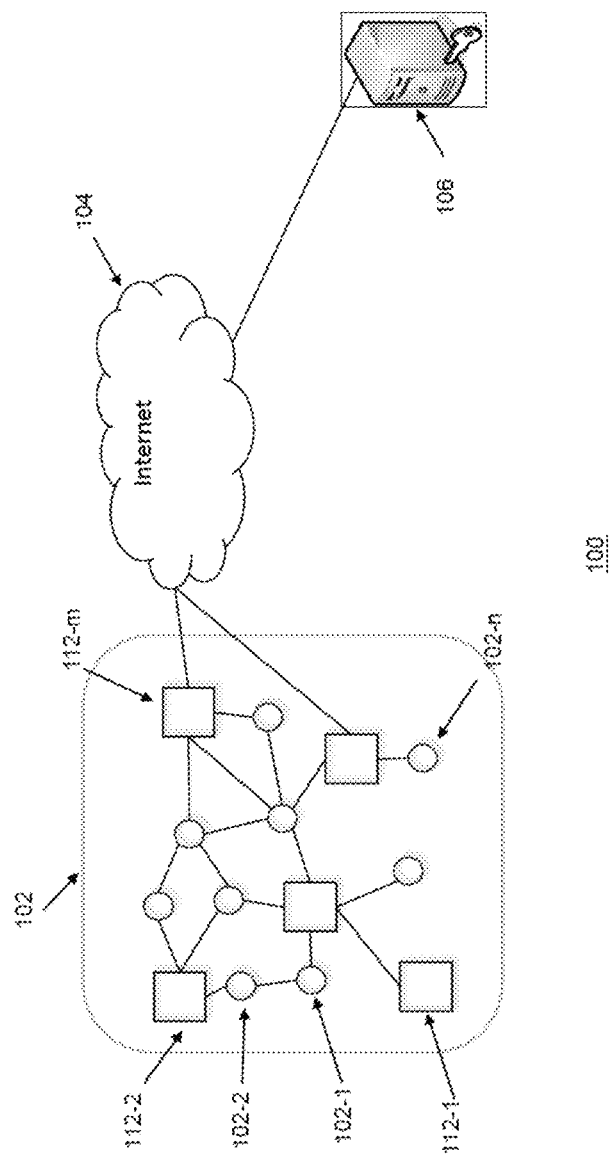
FIG. 4 is a topological representation of a network infrastructure in which the invention can advantageously be implemented.

FIG. 4 illustrates an example of a communication infrastructure 100 in which the invention can advantageously be implemented. For reasons of simplicity of description rather than of limitation of the invention, the example in FIG. 4 shows only a finite number of entities (or nodes) and connections, but a person skilled in the art will extend the principles described to a plurality and a variety of entities and connection types (wireless, mobile, very high speed).

The communication network (100) comprises fixed or mobile entities that can form a network of objects (102). The entities may have high resource constraints (102-1, 102-n) or lower resource constraints (112-1, 112-m).

The entities having high resource constraints may be wireless sensors or actuators, having limited computation and/or storage capacities. They may likewise be active tags. However, an entity that is not intrinsically limited in terms of resources may be temporarily so from the moment that it uses a large share of its processor resources for another task, or that its battery level reaches a critical threshold value. Furthermore, this entity can be prompted to implement protocols that are less costly in terms of power like that of the invention.

The entities having lower resource constraints may be portable telephones equipped with an Internet connection and a camera. They may likewise be gateways for interconnection of a network having constrained entities and the Internet. These entities provide greater computation power and storage capacity, can have a greater power reserve (battery, mains supply) and can communicate on a network, either directly on an Internet network (104) as illustrated or through gateways and intermediate servers (not shown).

The network of nodes (102) may be based on level 2 communications (for example 802.15.4 or 802.11) and/or level 3 communications (for example IP) between the entities that it is made up from. According to the protocols on which it relies, multicast or broadcast communication schemes can be used therein.

The present invention can be advantageously implemented in the environment of FIG. 4 between two nodes of the network, a source entity that is called the 'initiator' and a target entity that is called the 'responder'. The two entities need to set up a security association between them. A central key distribution server (106) that is called the trusted third party is responsible for authenticating the nodes. It may be remote and accessible via a third-party communication network (104) that may be a cellular network or the Internet network. The trusted third party stores cryptographic data that are necessary for authenticating each of the nodes.

During operation, each initiator and responder node authenticates itself to the central server by using its unique credentials, identity models and independent authentication methods that have the most correlation with each of their own specificities and constraints. Thus, by way of example, two nodes can set up a session key and associate it with their respective identities while the latter are respectively validated by means of a chip card for one and biometric authentication for the other. The trust server distributes one and the same session key to two nodes wishing to set up a security association between them, allowing decorrelated authentications for each node, as well as centralized control over the setup of keys and/or over the policies that accompany the latter.

Figure 5:
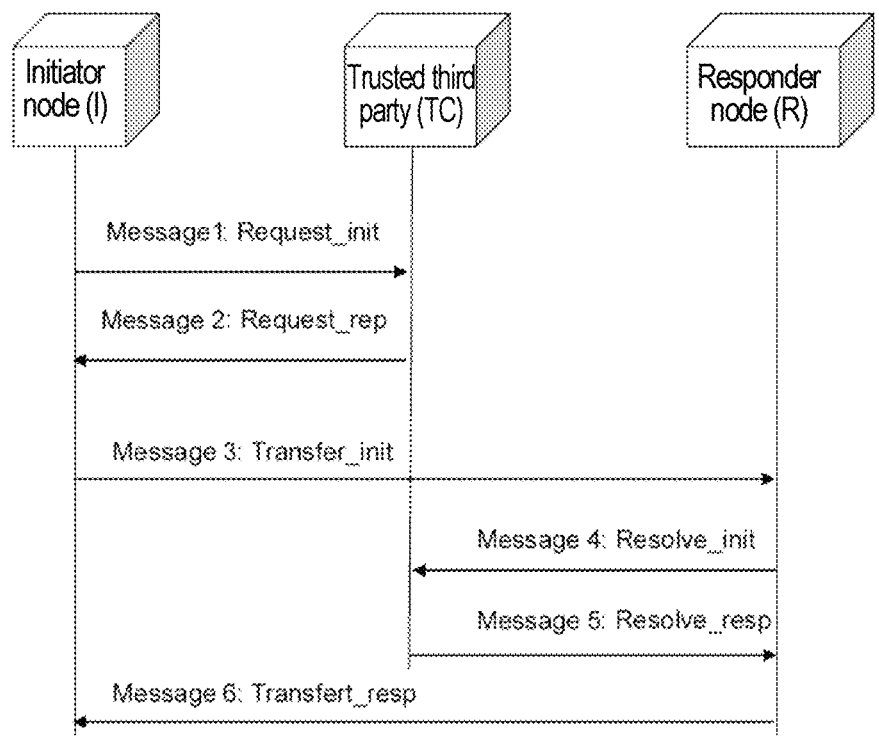
FIG. 5 shows the procedures carried out between the initiating, responding and trusted third party entities of the network in FIG. 4 based on the MIKEY-Ticket method.

FIG. 5 shows the procedures carried out according to the known MIKEY-Ticket protocol between an initiator node (I), a responder node (R) and a trusted third party (TC) of the network in FIG. 4.

Figure 6:
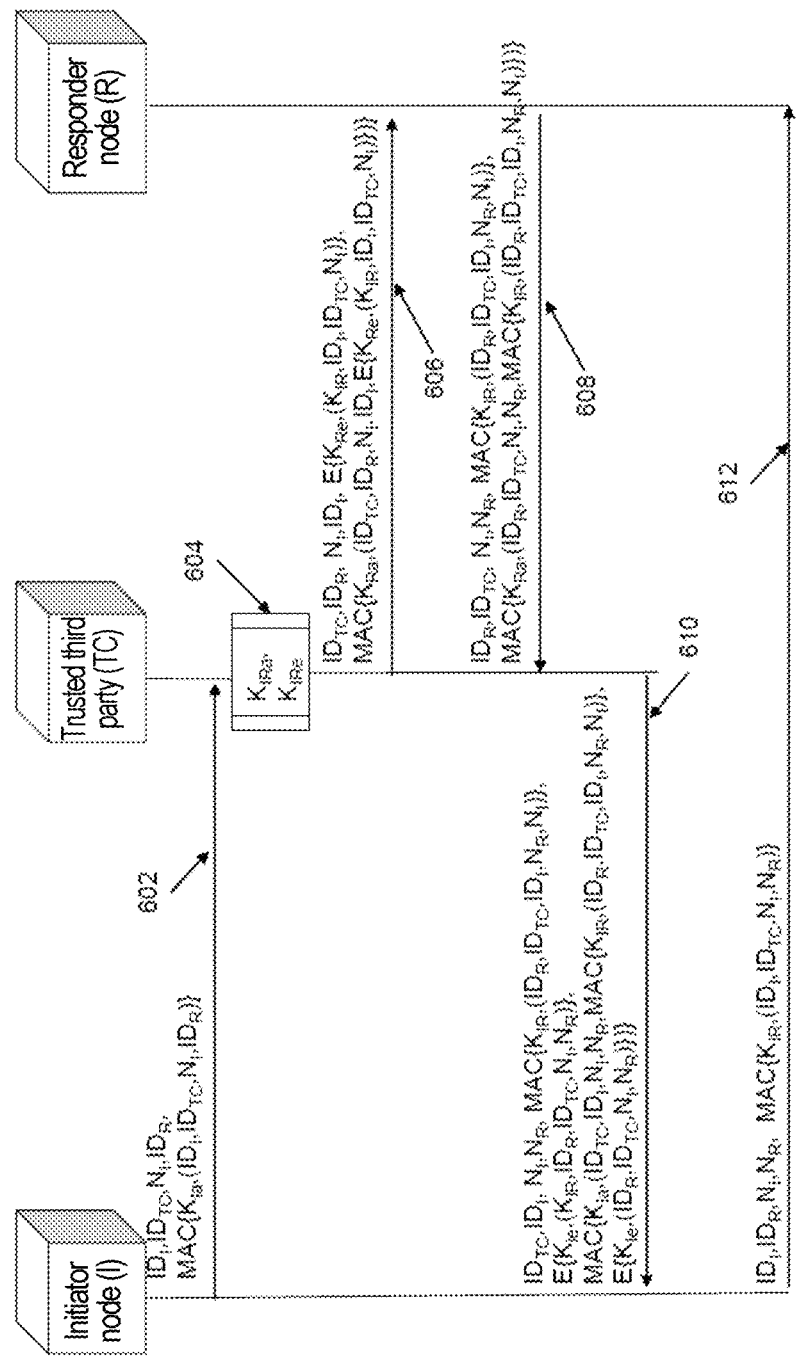
FIG. 6 shows the procedures carried out between the initiating, responding and trusted third party entities of the network in FIG. 4 in an advantageous implementation of the invention.
Figure 7:
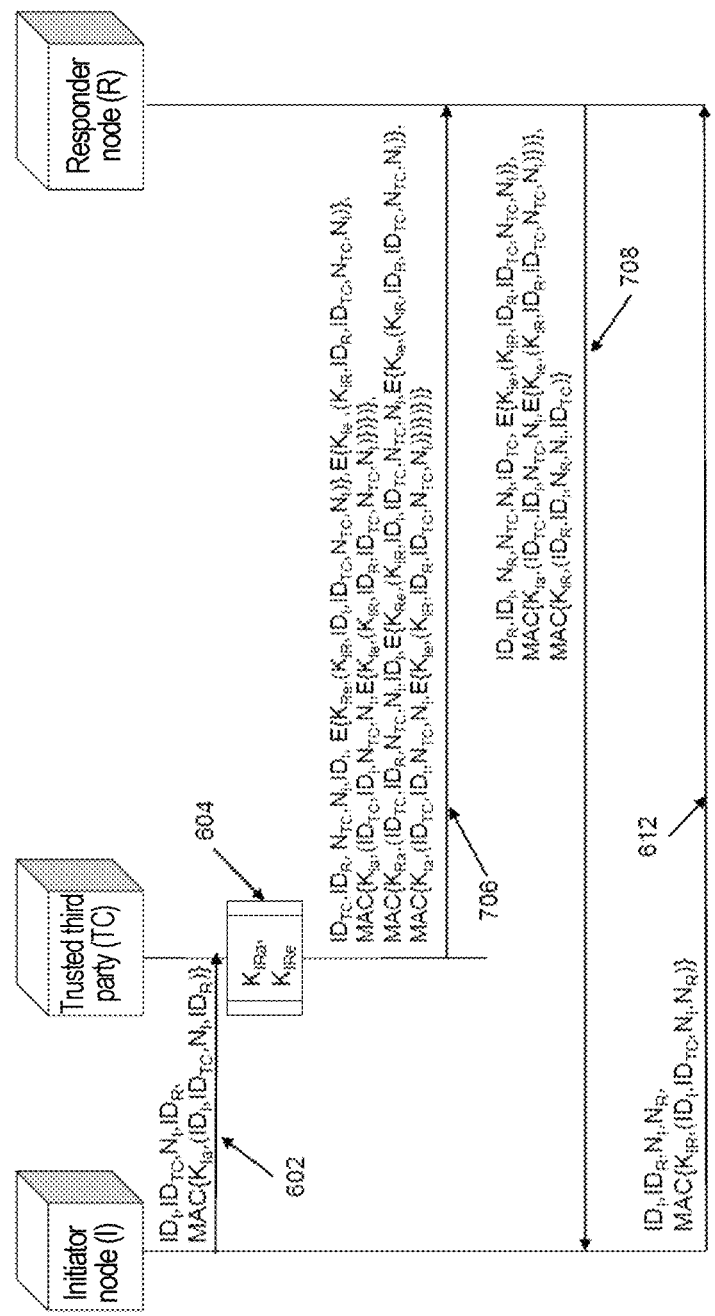
FIG. 7 shows the procedures carried out between the initiating, responding and trusted third party entities of the network in FIG. 1 in a variant implementation of the invention.

To make it easier to understand the invention, identical notations are used to describe the following FIGS. 5 to 7. Thus, subsequently:

Data$_1$, Data$_2$, etc. respectively denote the concatenation of the data in the messages 1, 2, etc. A person skilled in the art will appreciate that the present invention is not limited to the order indicated by way of example in the description of the messages for the concatenated data. Thus, for one and the same message, the transmissions of the same data in the form (Data$_1$, Data$_2$) and (Data$_2$, Data$_1$) are equivalent.

E{K, (Data$_1$, Data$_2$, etc.)} denotes the ciphering of the concatenated data (Data$_1$, Data$_2$, etc.) with a ciphering algorithm using a key K.

MAC{K, (Data$_1$, Data$_2$, etc.)} denotes the message authentication code (MAC) on the concatenated data (Data$_1$, Data$_2$, etc.) using a key K.

As has been explained previously, the MIKEY-Ticket protocol has been defined to extend the MIKEY protocol through the use of a trusted third party and is based on the exchange of six messages between the three entities: initiator (I), responder (R) and trusted third party (TC).

An initiator node sends a first message in the form of an initialization request "Request_init" to the trusted third party. The request contains an authentication code MAC that is computed using its key "$K_{Ia}$". On receiving this first message, TC checks the validity of the MAC and the authenticity of the data (Data$_1$) sent by the initiator. These data principally contain an identifier from the responder node with which the initiator node wishes to set up a session, a nonce and information about the ciphering and MAC computation algorithms supported by the initiator.

The trusted third party generates a key "$K_{IR}$" and transmits it to the initiator in a response message "Request_resp". The key $K_{IR}$ is ciphered by the ciphering key "$K_{Ie}$" of the initiator. The second message moreover contains a ticket "Ticket$_I$" for the initiator and an MAC computed using the key $K_{Ia}$.

On receiving the message, the initiator checks the validity of the MAC and recovers its key $K_{IR}$ that will allow it to derive two keys "$K_{IRa}$" and "$K_{Ire}$" with the responder. The key $K_{IRa}$ will be used to compute MACs, while the key $K_{IRe}$ will allow data to be encrypted.

The initiator then sends a message "Transfert_init" that contains its ticket "Ticket," to the responder. This third message contains an MAC computed using the key $K_{IRa}$.

It should be noted that at this level of the execution of the protocol the responder node (R) has not yet received the key $K_R$ and has therefore not received the keys $K_{IRa}$ and $K_{Re}$. Therefore, (R) cannot check the validity of the MAC that it has just received from the initiator node, and has to send the trusted third party (TC) a message "Resolve_init" in order to ask it to communicate the key $K_R$ to it.

On receiving the fourth message, the trusted third party checks the validity of the MAC from the responder by using the key $K_{Ra}$. If the MAC is valid, it sends the key $K_R$ ciphered by the key $K_{Re}$ to the responder, in a fifth message "Resolve_resp".

On receiving the fifth message, the responder checks the MAC computed by the trusted third party and recovers the key $K_R$. Once the key $K_R$ has been received, the responder computes the key $K_{IRa}$ and checks the value of the MAC computed by the initiator in the third message "Transfert_init". If the value of the MAC is valid, the responder sends a sixth message "Transfert_resp" to the initiator in order to acknowledge due receipt of the key $K_R$.

Thus, as has already been discussed above, the responder node takes the MAC sent by the initiator in the third message only after having exchanged the fourth and fifth messages with the trusted third party; it may then be the target of a denial of service attack. An attacking node can bombard the responder node with an unlimited number of messages of "Transfer_init" type (third message) in order to oblige it to compute a large number of "Resolve-init" messages (fourth message) and thus to exhaust all the power and computational resources of the responder node.

FIG. 6 shows the procedures carried out between Initiator (I), Responder (R) and Trusted Third Party (TC) entities of the network in FIG. 4 in an advantageous implementation of the invention.

A great benefit of the invention lies in the power efficiency of the implemented method that is obtained by means of a reduced number of exchanged messages. The method proposed allows the setup of secure communication between an initiator node and a responder node in five message exchanges in the implementation in FIG. 6, or in four message exchanges according to the implementation in FIG. 7. It should be noted that the last message described for the two examples is exchanged between the initiator and the responder and corresponds to a key confirmation by the initiator that may be implicit. The secure interchange of the data between the initiator and the responder is able to begin after the fourth and third messages, respectively, in FIGS. 6 and 7.

A person skilled in the art will appreciate that the message exchanges provide equivalent roles for the initiator node (I) and for the receiver node (R) vis-á-vis the trusted third party (TC). This is because the interactions are of (I)↔(TC), (TC)↔(I), (R)↔(TC) and (TC)↔(R) type and thus provide the trusted third party with better control of session key setup.

The implementation illustrated by FIG. 6 may advantageously be applied when secure communication is set up between two nodes that do not share any secret directly but that each share one or more secrets with a trusted third party (TC). The trusted third party and the initiator initially share two keys ($K_{Ie}$, $K_{Ia}$), where $K_{Ie}$ is a key that is used for ciphering data, and where $K_{Ia}$ is a key that is used for computing a message authentication code (MAC). $K_{Ie}$ and $K_{Ia}$ can be derived from a master key following authentication of the initiator with the trusted third party. For its part, the responder (R) likewise shares a pair of keys ($K_{Re}$, $K_{Ra}$) with the trusted third party.

A person skilled in the art will understand that, for the sake of simplifying the description of the variant in FIG. 6, the initiator and the responder each denote a single entity, but that in a more general case there may be a group of initiator nodes and/or a group of responder nodes using individual keys and/or group keys.

In order to set up a secure communication channel with the responder (R), the initiator (I) contacts the trusted third party (TC) so that it creates one or more keys for them. To simplify the description of the protocol, in the variant in FIG. 6, the trusted third party generates a single key $K_{IR}$ for the two nodes (I) and (R). Then, the trusted third party sends the key $K_{IR}$ encrypted with the key $K_{Ie}$ to the initiator and sends the key $K_{IR}$ encrypted with the key $K_{Re}$ to the responder. The integrity of the exchanged messages is ensured by the addition of MACs, which are respectively computed by means of the keys $K_{Ia}$ and $K_{Ra}$.

In more detailed fashion with reference to FIG. 6, the initiator begins the method by sending a first message "Message1" to the trusted third party. This message contains the identifiers from the initiator ($ID_I$), from the trusted third party ($ID_{TC}$) and from the responder ($ID_R$). It also contains a nonce ($N_I$) that is used to prove the freshness of the session and to avoid replay attacks. Moreover, the initiator adds to message1 an MAC ($MAC_{I1}$) that is computed on ($ID_I$, $ID_{TC}$, $ID_R$ and $N_I$) using the key $K_{Ia}$. The MAC allows the authenticity of the data received in the first message to be proved to the trusted third party.

The identifiers ($ID_I$, $ID_{TC}$, $ID_R$) may be dependent on the technology used and on the type of network deployed. These identifiers may be IPv6 addresses, MAC addresses or URLs, for example. In the special case of IP networks, the identifiers $ID_I$ and $ID_{TC}$ can correspond to the source address and the destination address, respectively, of the IP packet.

The nonce may be a piece of timestamp information, a random number or a counter (sequence number). This must be a piece of information that is variable and unique over time and that allows distinction between the various executions of the known Menezes, Van Oorschot and Vanstone protocol, which is described in the document "Handbook of applied cryptography", chapter 10. The nonce may also be formed by combining the techniques cited previously. By way of example, a nonce may be formed by a piece of timestamp information and a random number.

On receiving the first message, the trusted third party checks the freshness of the nonce ($N_I$) and uses the key $K_{Ia}$ to compute the MAC ($MAC_{TC1}$) on ($ID_I$, $ID_{TC}$, $ID_R$ and $N_I$). Then, it checks the equality between the $MAC_{I1}$ received from the initiator and its own MAC ($MAC_{TC1}$) so as to check the integrity of the received message. If the two values are equal, the trusted third party will generate a second message "Message2" in order to send it to the receiver. The trusted third party begins by generating a key $K_{IR}$ for the initiator and the responder. It then sends this key $K_{IR}$ cited by the ciphering key $K_{Re}$ to the responder. The message sent to the responder moreover contains an MAC ($MAC_{TC2}$) that allows the responder to check the integrity of the data received.

In a preferred implementation, the trusted third party concatenates the key $K_{IR}$ with the identifiers $ID_I$ and $ID_{TC}$, and the nonce $N_I$, before ciphering the whole using the key $K_{Re}$ in order to obtain a cipher $E\{K_{Re}, (K_{IR}, ID_{TC}, ID_I, N_I)\}$. This second message also contains the identifiers ($ID_I$, $ID_{TC}$, $ID_R$), the nonce $N_I$ and the MAC ($MAC_{TC2}$). The MAC ($MAC_{TC2}$) is computed using the key $K_{Ra}$ on the following fields: $ID_{TC}$, $ID_R$, $ID_I$, $N_I$ and $E\{K_{Re}, ID_{TC}, ID_I, N_I\}$.

On receiving the second message, the responder checks the equality between the received $MAC_{T2}$ and its own MAC value ($MAC_{R2}$), which it computes using the key $K_{Ra}$. If the value of $MAC_{TC2}$ is correct, the responder deciphers the content of $E\{K_{Re}, (K_{IR}, ID_{TC}, ID_I, N_I)\}$ in order to recover the key $K_{IR}$.

The responder generates a nonce ($N_R$) and computes an MAC ($MAC_{RI}$) using the key $K_{IR}$ on the identifier ($ID_R$, $ID_{TC}$, IN and nonce ($N_I$, $N_R$) data. The MAC ($MAC_{RI}$) will be transmitted by the trusted third party to the initiator in order to allow it to check that the responder has indeed received the key $K_{IR}$.

In a first variant, the responder uses the nonces ($N_I$, $N_R$) and the key $K_{IR}$ as inputs for a pseudorandom function for generating two keys "$K_{IRa}$" and "$K_{IRe}$". The key $K_{IRa}$ is used to compute the MACs, and the key $K_{IRe}$ is used to cipher the data between the initiator and the responder.

In a second variant, the trusted third party generates two keys, "$K_{IRa}$" and "$K_{IRe}$", for the initiator and the responder. These keys will be sent by the trusted third party to the initiator and the responder and will respectively be used to compute MACs and to cipher the data.

To simplify the notations, the notation $K_{IR}$ is subsequently used both to denote the key used to compute the MACs and for ciphering, independently of the methods that have allowed generation of the keys $K_{IRa}$ and $K_{IRe}$.

The responder generates a third message "Message3" for the trusted third party. The message contains the identifiers ($ID_R$) and ($ID_{TC}$), the nonces ($N_R$) and ($N_I$), the $MAC_{RI}$ and a new MAC ($MAC_{R3}$), computed using the key $K_{Ra}$ on all the previous data.

On receiving the third message, the trusted third party checks the freshness of the nonce $N_R$ and computes the $MAC_{TC3}$ by using the key $K_{Ra}$ and the identifier ($ID_R$, $ID_{TC}$), nonce ($N_R$, $N_I$) and MAC ($MAC_{RI}$) data.

The trusted third party then checks that the computed $MAC_{TC3}$ is indeed equal to the $MAC_{R3}$ received from the receiver. If the value of the received $MAC_{TC3}$ is valid, the trusted third party generates a message "Message4" bound for the initiator. The fourth message contains the nonces $N_R$ and $N_I$, the $MAC_{IR}$ and the key $K_R$ ciphered by the key $K_{Ie}$.

In a preferred implementation, the key $K_R$ is concatenated with the identifiers from the responder $ID_R$ and from the trusted third party $ID_{TC}$, and with the nonces $N_I$ and $N_R$ before being ciphered with the key $K_{Ie}$ to produce a cipher $E\{K_{Ie}, (K_{IR}, ID_R, ID_{TC}, N_I, N_R)\}$.

The message sent by the trusted third party to the initiator moreover contains an MAC ($MAC_{TC4}$) computed using the key $K_{Ia}$ that allows the initiator to check the integrity of the received data.

On receiving the fourth message, the initiator computes its MAC ($MAC_{I4}$) using its key $K_{IA}$ and then compares it with the MAC ($MAC_{TC4}$) sent by the trusted third party. If the two MACs are equal, the initiator deciphers the content of $E\{K_{Ie}, (K_{IR}, ID_R, ID_{TC}, N_I, N_R)\}$ using its key $K_{Ie}$ in order to recover the key $K_{IR}$.

Next, the initiator uses the key $K_R$ to check the value of the MAC ($MAC_{RI}$) that has been computed and sent by the receiver in the third message. To this end, the initiator locally computes an MAC ($MAC_{IR}$) on the same fields as those that have been used by the receiver for computing the ($MAC_{RI}$), namely the identifiers ($ID_R$, $ID_{TC}$, $ID_I$) and the nonces ($N_I$, $N_R$). Then, the initiator compares its $MAC_{IR}$ and the $MAC_{RI}$ for equality. If the two MACs are equal, this means that the responder has indeed received the key $K_{IR}$ from the trusted third party. To acknowledge correct reception of the fourth message, the initiator generates a message "Message5" bound for the responder.

The initiator sends the fifth message 5, which contains the respective identifiers from the initiator and from the responder ($ID_I$ and $ID_R$), their nonces ($N_I$, $N_R$) and an MAC ($MAC_{I5}$) calculated with the key $K_{IR}$, directly to the responder.

On receiving the fifth message, the responder checks the value of the received MAC ($MAC_{I5}$) by computing its own MAC ($MAC_{R5}$). If the two MACs are equal, the responder R concludes that the initiator has indeed received the key $K_{IR}$ from the trusted third party.

FIG. 7 shows the procedures carried out between the initiator, responder and trusted third party entities of the network in FIG. 4 in a variant implementation of the invention involving four exchanged messages.

The initiator starts the process by sending a first message "Message1" to the trusted third party. The content of the first message is identical to that described with reference to FIG. 6.

After receiving Message1, the trusted third party TC generates a nonce ($N_{TC}$), as well as the key $K_{IR}$ for the initiator and the responder. The nonce $N_{TC}$ is an optional parameter that allows the addition of freshness to the second message when the responder associates the freshness of the message with the reception of a new nonce from the initiator but also from the trusted third party.

The addition of the nonce ($N_{TC}$) can be decided upon when the security policy is set up by the administrator of the network.

The trusted third party uses the key $K_{Re}$ to cipher the nonce, the key $K_{IR}$ and this same key $K_{IR}$ ciphered and protected in terms of integrity by the keys $K_{Ie}$ and $K_{Ia}$ that are shared with the initiator. The cipher is sent in a second message "Message2bis" to the responder. The message moreover contains an MAC computed using the key $K_{Ra}$, in order to allow the responder to check the integrity of the received data.

After receiving the second message, the responder checks the integrity and the authenticity of the received message by using its key $K_{Ra}$. If the result of the check is positive, the responder deciphers the message in order to recover the shared key $K_R$.

Next, the responder generates a nonce ($N_R$) and then sends, in a third message "Message3bis", the data received from the trusted third party TC in the second message and containing the key $K_R$ ciphered and authenticated using the keys $K_{Ie}$ and $K_{Ia}$ shared between the trusted third party and the initiator. To allow the initiator to check that the responder has indeed received the shared key $K_R$, the responder also sends an MAC computed using this key $K_{IR}$.

On receiving the third message, the initiator checks the integrity of the first portion of the message generated by the trusted third party by using the key $K_{Ia}$. If the check is successful, the initiator recovers the shared key $K_{IR}$ by using its key $K_{Ie}$. Then, it checks the MAC sent by the responder by using the key $K_{IR}$.

The initiator then sends a fourth message, which contains the identifiers from the initiator and from the responder ($ID_I$, $ID_R$), their nonces ($N_I$, $N_R$) and an MAC ($MAO_{I5}$) computed using the key $K_R$, directly to the responder.

On receiving the fourth message, the responder checks the value of the $MAC_{I5}$ received by computing its own $MAC_{R5}$. If the two MACS are equal, the responder concludes that the initiator has indeed received the key $K_{IR}$ from the trusted third party.

A person skilled in the art will appreciate that variations can be made to the method as described in a preferred manner while maintaining the principles of the invention. Thus, the examples described are based on a preferred protocol but it is possible to use other authentication protocols.

The present invention can be implemented on the basis of hardware and/or software elements. It may be available as a computer program product on a computer-readable medium. The medium may be electronic, magnetic, optical, electromagnetic or may be an infrared-type broadcast medium. Examples of such media are semiconductor memories (Random Access Memory RAM, Read-Only Memory ROM), tapes, floppy disks or magnetic or optical disks (Compact Disk—Read Only Memory (CD-ROM), Compact Disk—Read/Write (CD-R/W) and DVD).

The invention claimed is:

1. In a communication network comprising a plurality of communicating entities, a method for setting up a session key between a source entity and a target entity, the source entity sharing with a third-party trusted entity a first source key $K_{Ie}$ for ciphering data and a second source key $K_{Ia}$ for computing a message authentication code for the source entity, the target entity sharing with said third-party trusted entity a first target key $K_{Re}$ for ciphering data and a second target key $K_{Ra}$ for computing a message authentication code for the target entity, the method comprising the steps of:
   receiving, by a computing device, at the third-party trusted entity, a message from the source entity for setting up a session with the target entity, the message containing at least identifiers from the source entity, from the target entity, from said third-party trusted entity and an authentication code based on the second source key $K_{Ia}$;
   generating a pair $K_{IR}$ of keys ($K_{IRa}$, $K_{IRe}$) for the source entity and for the target entity;
   encrypting the pair $K_{IR}$ of keys ($K_{IRa}$, $K_{IRe}$) by means of the first source key $K_{Ie}$ and by means of the first target key $K_{Re}$;
   sending to the target entity a message containing at least the encrypted key $K_{IR}$ and an authentication code based on the second target key $K_{Ra}$;
   receiving from the target entity a message containing at least the identifiers from the source entity, from the target entity, from said third-party trusted entity and an authentication code based on the second target key $K_{Ra}$; and
   sending to the source entity a message containing at least the encrypted key $K_{IR}$ and an authentication code based on the second source key $K_{Ia}$.

2. The method as claimed in claim 1, in which the source key $K_{Ie}$ for ciphering data and the source key $K_{Ia}$ for the authentication code are derived from an initial key that is obtained after a step of authentication of the target entity to the third-party trusted entity.

3. The method as claimed in claim 1, in which the message received from the source entity moreover comprises a source nonce ($N_I$) for proving the freshness of the message from the source entity.

4. The method as claimed in claim 3, in which the step of generating the key $K_{IRa}$ for the source entity comprises the steps of concatenating the key $K_{IRa}$ with the identifiers from the target entity, from the third-party trusted entity and from the nonce $N_I$ and of ciphering the concatenated assembly using the first target key $K_{Re}$.

5. The method as claimed in claim 4, in which the message sent to the target entity moreover comprises the nonce ($N_I$), and the authentication code based on the second target key $K_{Ra}$ is computed on the nonce.

6. The method as claimed in claim 5, in which the message received from the target entity moreover comprises the source nonce ($N_I$) and a target nonce ($N_R$) for proving the freshness of the target message.

7. The method as claimed in claim 6, comprising a step of computing an authentication code by using the second target key $K_{Ra}$, the identifiers, the source and target nonces ($N_I$, $N_R$) and the received authentication code based on the second target key $K_{Ra}$ and a step of checking whether the computed authentication code is equal to the received authentication code.

8. The method as claimed in claim 7, in which the message sent to the source entity moreover comprises the source and target nonces ($N_I$, $N_R$).

9. The method as claimed in claim 6, moreover comprising the step of sending a message from the source entity to the target entity that contains the identifiers from the source entity and from the target entity, the source and target nonces ($N_I$, $N_R$) and an authentication code computed using the pair of keys for the source entity and the target entity.

10. The method as claimed in claim 3, in which the nonce is either a piece of timestamp information, a random number or a counter.

11. The method as claimed in claim 1, in which the identifiers from the source and target entities are either IPv6 addresses, MAC addresses or URLs.

12. The method as claimed in claim 1, in which the message sent to the target entity moreover contains a key ciphered by the keys $K_{Ie}$ and $K_{Ia}$ and where the message received from the target entity and the message sent to the source entity are a single message sent from the target entity to the source entity.

13. A system for setting up a session key between a source entity and a target entity, the source entity sharing with a third-party trusted entity a first source key $K_{Ie}$ for ciphering data and a second source key $K_{Ia}$ for computing a message authentication code for the source entity, the target entity sharing with said third-party trusted entity a first target key $K_{Re}$ for ciphering data and a second target key $K_{Ra}$ for computing a message authentication code for the target entity, the system comprising at least one processor configured to implement the steps of:

receiving, by a computing device, at the third-party trusted entity, a message from the source entity for setting up a session with the target entity, the message containing at least identifiers from the source entity, from the target entity, from said third-party trusted entity and an authentication code based on the second source key $K_{Ia}$;

generating a pair $K_{IR}$ of keys ($K_{IRa}$, $K_{IRe}$) for the source entity and for the target entity;

encrypting the pair $K_{IR}$ of keys ($K_{IRa}$, $K_{IRe}$) by means of the first source key $K_{Ie}$ and by means of the first target key $K_{Re}$;

sending to the target entity a message containing at least the encrypted key $K_{IR}$ and an authentication code based on the second target key $K_{Ra}$;

receiving from the target entity a message containing at least the identifiers from the source entity, from the target entity, from said third-party trusted entity and an authentication code based on the second target key $K_{Ra}$; and sending to the source entity a message containing at least the encrypted key $K_{IR}$ and an authentication code based on the second source key $K_{Ia}$.

14. The system as claimed in claim 13, where the source entity is a group of source nodes and/or the target entity is a group of target nodes using individual keys and/or group keys.

15. A computer program product stored on a non-transitory computer-readable medium, said computer program comprising code instructions allowing the steps of a method to be performed when said program is executed on a computer, said method being for setting up a session key between a source entity and a target entity, the source entity sharing with a third-party trusted entity a first source key $K_{Ie}$ for ciphering data and a second source key $K_{Ia}$ for computing a message authentication code for the source entity, the target entity sharing with said third-party trusted entity a first target key $K_{Re}$ for ciphering data and a second target key $K_{Ra}$ for computing a message authentication code for the target entity, the instructions comprising:

receiving, by a computing device, at the third-party trusted entity, a message from the source entity for setting up a session with the target entity, the message containing at least identifiers from the source entity, from the target entity, from said third-party trusted entity and an authentication code based on the second source key $K_{Ia}$;

generating a pair $K_{IR}$ of keys ($K_{IRa}$, $K_{IRe}$) for the source entity and for the target entity;

encrypting $K_{IR}$ of keys ($K_{IRa}$, $K_{IRe}$) by means of the first source key $K_{Ie}$ and by means of the first target key $K_{Re}$;

sending to the target entity a message containing at least the encrypted key $K_{IR}$ and an authentication code based on the second target key $K_{Ra}$;

receiving from the target entity a message containing at least the identifiers from the source entity, from the target entity, from said third-party trusted entity and an authentication code based on the second target key $K_{Ra}$; and sending to the source entity a message containing at least the encrypted key $K_{IR}$ and an authentication code based on the second source key $K_{Ia}$.

\* \* \* \* \*